US012117046B2

(12) United States Patent
Doster et al.

(10) Patent No.: US 12,117,046 B2
(45) Date of Patent: Oct. 15, 2024

(54) SWITCHING DEVICE FOR A TRANSMISSION OF A MOTOR VEHICLE AND METHOD FOR OPERATING SUCH A SWITCHING DEVICE

(71) Applicant: Mercedes-Benz Group AG, Stuttgart (DE)

(72) Inventors: Thomas Doster, Tamm (DE); Tobias Schuster, Esslingen (DE); Nils Hirsemann, Bruchsal (DE); Wadim Belewitsch, Esslingen am Neckar (DE); Thomas Stegmaier, Schwaebisch Gmuend (DE); Lukas Becker, Dettingen (DE); Udo Scharrer, Esslingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/042,704

(22) PCT Filed: Mar. 2, 2022

(86) PCT No.: PCT/EP2022/055245
§ 371 (c)(1),
(2) Date: Feb. 23, 2023

(87) PCT Pub. No.: WO2022/194549
PCT Pub. Date: Sep. 22, 2022

(65) Prior Publication Data
US 2024/0011530 A1    Jan. 11, 2024

(30) Foreign Application Priority Data
Mar. 17, 2021   (DE) .................. 10 2021 001 425.1

(51) Int. Cl.
*F16D 48/10* (2006.01)
*F16D 11/14* (2006.01)
(Continued)

(52) U.S. Cl.
CPC .............. F16D 11/14 (2013.01); F16D 48/06 (2013.01); *F16D 2011/008* (2013.01); *F16D 2300/14* (2013.01); *F16D 2300/18* (2013.01)

(58) Field of Classification Search
CPC .............. F16D 48/10; F16D 2500/501; F16D 2500/502; F16D 2300/18; F16D 2011/008;
(Continued)

(56) References Cited

U.S. PATENT DOCUMENTS 5,594,173 A * 1/1997 Frey ........................ G01P 21/02
73/520.01
2012/0119730 A1 * 5/2012 Sanchez Exposito .. G01P 3/488
324/207.25
(Continued)

FOREIGN PATENT DOCUMENTS

| DE | 10 2008 061 509 A1 | 6/2010 |
| DE | 10 2010 043 592 A1 | 5/2012 |

(Continued)

OTHER PUBLICATIONS

PCT/EP2022/055245, International Search Report dated May 20, 2022 (Two (2) pages).
(Continued)

*Primary Examiner* — Stacey A Fluhart
(74) *Attorney, Agent, or Firm* — Crowell & Moring LLP

(57) ABSTRACT

A switching device for a transmission of a motor vehicle includes an unsynchronized claw switching element that has a first switching part and a second switching part which are rotatable relative to each other around an axis of rotation.
(Continued)

The first switching part has a first switching gearing and the second switching part has a second switching gearing which are displaceable relative to each other along the axis of rotation between a coupled position and an uncoupled position. Rotation positions in which the first and second switching parts are rotated relative to each other are detectable by a detection device. An electronic computing device moves the first and second switching parts from the uncoupled position into the coupled position depending on detected rotation positions. The detection device has a sensor element and a transmitter element, with transmitter segments, fixedly connected to the second switching part.

3 Claims, 1 Drawing Sheet

(51) Int. Cl.
*F16D 48/06* (2006.01)
*F16D 11/00* (2006.01)

(58) Field of Classification Search
CPC ............ F16D 2500/10462; F16D 2500/30408; G05G 1/015
See application file for complete search history.

(56) References Cited

U.S. PATENT DOCUMENTS

| 2015/0114788 | A1* | 4/2015 | Lippenberger ........... G01D 5/12 |
| | | | 192/69.7 |
| 2016/0231198 | A1 | 8/2016 | Kaess et al. |
| 2020/0355228 | A1* | 11/2020 | Barrientos Blanco .. F16D 23/02 |

FOREIGN PATENT DOCUMENTS

| DE | 20 2011 050 731 U1 | 12/2012 |
| DE | 10 2011 051 859 A1 | 1/2013 |
| DE | 10 2013 221 056 A1 | 4/2015 |
| DE | 10 2018 214 082 A1 | 2/2020 |
| JP | 2019-127976 A | 8/2019 |
| JP | 2020-193648 A | 12/2020 |
| JP | 2021-25658 A | 2/2021 |

OTHER PUBLICATIONS

German Search Report issued in German application No. 10 2021 001 425.1 dated Sep. 15, 2021, with Statement of Relevancy (Eight (8) pages).
Japanese-language Japanese Office Action issued in Japanese Application No. 2023-518062 dated Mar. 26, 2024 (4 pages).

* cited by examiner

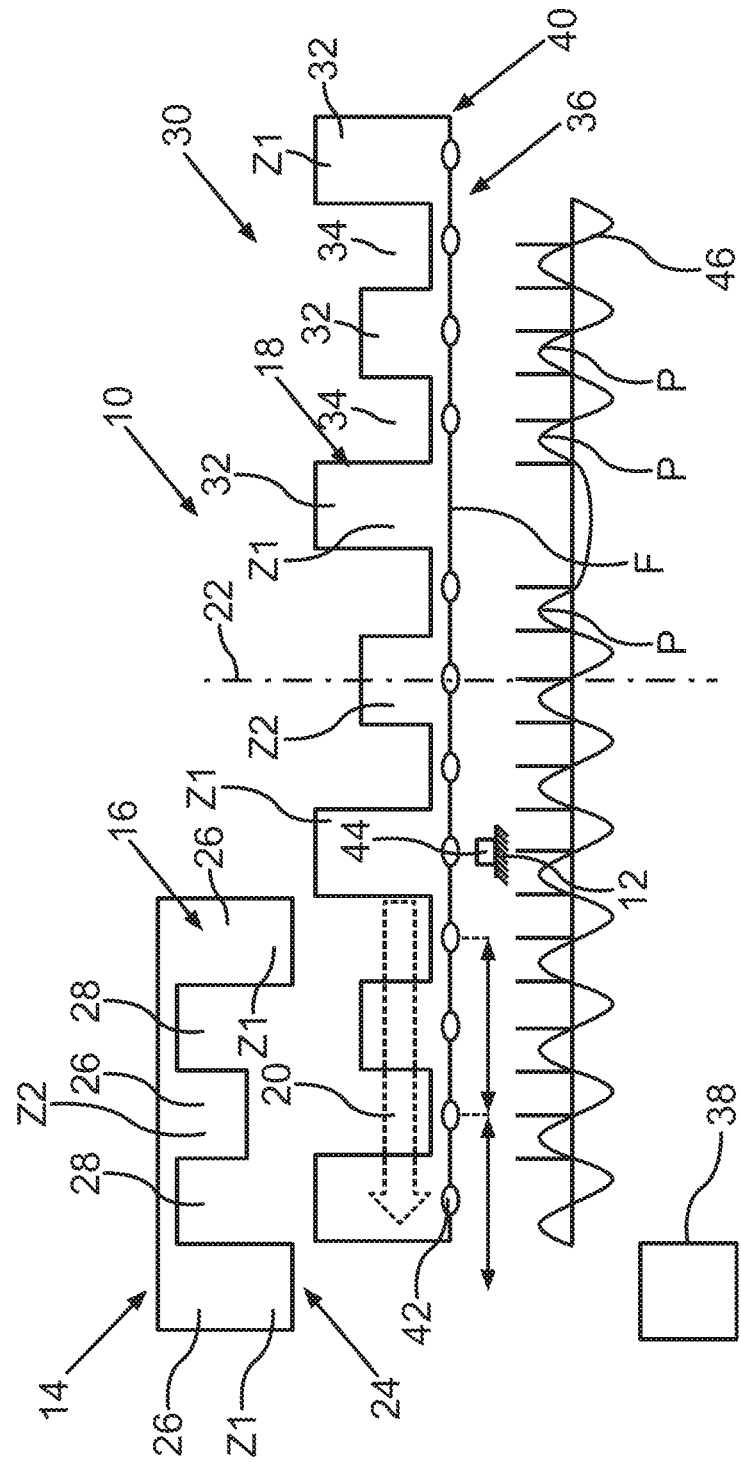

SWITCHING DEVICE FOR A TRANSMISSION OF A MOTOR VEHICLE AND METHOD FOR OPERATING SUCH A SWITCHING DEVICE

BACKGROUND AND SUMMARY OF THE INVENTION

The invention relates to a switching device for a transmission of a motor vehicle, particularly a motor car. The invention further relates to a method for operating such a switching device.

Such a switching device for a transmission of a motor vehicle can already be taken as known, for example, from DE 10 2010 043 592 A1. The switching device has at least one unsynchronized claw switching element, i.e., an unsynchronized, form-fit switching element, which comprises two switching parts that can be rotated relative to each other around an axis of rotation. The switching parts respectively have a switching gearing. The switching gearings face each other along the axis of rotation, for example. The switching parts can be displaced between at least one coupled position and at least one uncoupled position relative to each other along the axis of rotation. In the coupled position, the switching gearings engage with each other such that the switching gearings work together in a form-fit manner in the coupled position. The switching parts are thus connected to each other in a manner fixed against rotation. The switching gearings are uncoupled from each other in the uncoupled position. This means that the switching gearings do not engage with each other in the uncoupled position, and thus do not work together, such that the switching parts can be rotated relative to each other around the axis of rotation in the uncoupled position.

The object of the present invention is to further develop a switching device of the kind specified in the introduction and to create a method for operating the switching device such that it can be particularly advantageously switched.

In order to further develop a switching device of the kind specified herein such that the claw switching element also simply described as a switching element can be switched particularly advantageously, particularly from the uncoupled position into the coupled position, a particularly electric or electronic detection device is provided according to the invention, by means of which rotation positions can be detected in which at least one of the switching parts can be rotated relative to the other switching part around the axis of rotation, particularly in the uncoupled position. In other words, in the uncoupled position, the one switching part can be rotated relative to the other switching part around the axis of rotation, and thus moved into the rotation positions and thus take up the rotation positions relative to the other switching part. It is conceivable that the other switching part is fixed to a housing of the transmission in a manner fixed against rotation both in the uncoupled position and in the coupled position, particularly permanently, such that the other switching part cannot be rotated relative to the housing around the axis of rotation. This particularly means that the one switching part is fixed to the housing over the other switching part in a manner fixed against rotation in the coupled position. In the uncoupled position, the one switching part can be rotated relative to the other switching part and relative to the housing around the axis of rotation. The one switching part can thus be rotated relative to the housing and relative to the other switching part around the axis of rotation and thus be moved into the rotation positions in the uncoupled position. By detecting the rotation positions, it is particularly possible to determine or to set the rotation positions of the one switching part in relation to the other switching part and/or the housing so that a respective position, also described as a relative position or alignment, of the one switching part relative to the other switching part can be determined or detected using the respective detected rotation position. The respective rotation position can particularly be determined or detected as a respective position of the one switching part relative to the other switching part, such that the respective position or alignment of the one switching part relative to the other switching part is known by detecting the respective rotation position, for example. The detection device is particularly designed to detect a rotational speed of the one switching part, which rotates relative to the other switching part around the axis of rotation at the rotational speed, particularly in the uncoupled position. It is thus conceivable that the detection device is a rotational speed detection system by means of which the rotational speed and thus the rotation positions of the one switching part can be detected, i.e., measured.

It is further provided according to the invention that the switching device has an electronic computing device, also described as an electronic control device, that is designed to move the switching parts from the uncoupled position into the coupled position depending on the detected rotation positions. The claw switching element, also described as a form-fit switching element, can thus be switched without a so-called tooth-to-tooth position arising. In other words, the switching parts can be moved from the uncoupled position into the coupled position without a so-called tooth-to-tooth position arising. The invention is particularly based on the following knowledge: Claw switching elements are conventionally synchronized via pre-synchronization, particularly designed as friction synchronization, to reduce or remove a rotational speed difference between the switching parts of the claw switching element, whereupon the switching gearings can be brought into engagement with each other. Increased wear, and also optionally rattling, i.e., unwanted noises and thus a compromise on comfort can result, particularly owing to a tooth-to-tooth position.

On the one hand, the invention enables the unsynchronized claw switching element to be used, i.e., at least one friction-fit synchronization of the claw switching element is not required. On the other hand, the invention makes it possible to avoid tooth-to-tooth positions, particularly when moving the switching parts from the uncoupled position into the coupled position, as the rotation positions also described as rotation angle positions are detected, and to move the switching parts from the uncoupled position into the coupled position depending on the detected rotation angle positions. By taking the rotation positions into account, the electronic computing device can move the switching parts from the uncoupled position into the coupled position in such a way and at such a time that a tooth-to-tooth position, and therefore an increased wear and unwanted noises do not arise. Moving the switching parts from the uncoupled position into the coupled position is also described as meshing the switching parts or the claw switching element, also simply described as a claw. It is particularly possible to control the meshing of the claw in a targeted manner depending on the detected rotation positions (rotation angle positions). Particularly in connection with a sufficiently precise torque or rotational speed transmitter for detecting the rotation positions, e.g., an electric motor and a suitable claw geometry, e.g., a catching and locking tooth design, a locking tooth or a first of the switching parts and/or the second switching part can be controlled in a targeted manner to avoid a tooth-to-tooth position and unwanted phenomena resulting from the latter, such as rattling, compromise on comfort or unwanted noises during the meshing of the claws.

Unsynchronized claw switching elements are cost-efficient, installation space-efficient and technologically simple, as a particularly friction-fit pre-synchronization is not required. Particularly in a transmission for an electrified drive having an electric engine as a drive engine, wherein, for example, the first switching part or the second switching part, particularly the one switching part is connected to the electric engine, particularly to a rotor of the electric engine, particularly in a manner fixed against rotation, the meshing of the claw, also described as a meshing process, can be controlled by means of the electric engine. An electric engine can be controlled well and quickly in comparison with an internal combustion engine, and can also be well and quickly controlled to a rotational speed of zero, such that the claw does not need to be synchronized. The meshing can consequently be carried out with high switching comfort.

The motor vehicle is preferably electric, particularly purely electric, such that the transmission is preferably a transmission of an electric vehicle, particularly a purely electric vehicle. The switching parts are also described as switching element halves, for example. The respective switching gearing has teeth that can also be described as claw teeth. It is conceivable that respective tooth ends of the claw teeth of the respective switching part are aligned axially, i.e., towards the respective other switching part opposite along the axis of rotation, such that it is preferably provided that the switching parts are arranged in the axial direction, i.e., next to each other or following one after the other along the axis of rotation. The switching gearing of the one switching part thus preferably faces the other switching part, and the switching gearing of the other switching part faces the one switching part axially, particularly in such a way that the switching gearing of the one switching part faces the switching gearing of the other switching part axially, and the switching gearing of the other switching part faces the switching gearing of the one switching part axially. Respective lengths of the respective claw teeth of the respective switching gearing extend axially for each switching part from a determined shared axial reference plane to the respective tooth ends at which the respective teeth of the respective switching gearing end, for example.

If the switching parts are in the coupled position, then the claw switching element is in a closed state. It is preferably provided that the respective teeth of the respective switching gearing engage with claw gaps, also described as gaps or tooth gaps, of the respective other switching gearing in the closed state of the claw switching element, wherein the respective claw gaps of the respective switching gearing are arranged between the respective teeth of the respective switching gearing, particularly in the circumferential direction of the respective switching part running around the axis of rotation.

It is further preferably provided that at least one of the claw teeth of the respective switching gearing is designed as a catching tooth, of which particularly the axial length, and thus the length running along the axis of rotation is greater than the lengths of other claw teeth of the respective switching gearing designed as locking teeth.

It has further proved particularly advantageous if the detection device has at least one sensor element and at least one transmitter element connected to the one switching part in a manner fixed against rotation. The transmitter element is preferably a transmitter wheel. The sensor element is also described as a sensor, for example. The sensor element is connected to the housing in a manner fixed against rotation and/or to the other switching part in a manner fixed against rotation. As the transmitter element is connected to the one switching part in a manner fixed against rotation, the transmitter element can be rotated with the one switching part relative to the sensor element, and particularly relative to the other switching part or to the housing around the axis of rotation. The transmitter element has transmitter segments. The transmitter segments are arranged one after the other in the circumferential direction of the transmitter element running around the axis of rotation, and particularly spaced apart from one another such that a transmitter gap, also simply described as a gap, is arranged between two respective neighboring transmitter segments. The transmitter segments can be detected by means of the sensor element (sensor), such that the rotation positions of the one switching part can be detected using the detection of the transmitter segments. In other words, the respective rotation position can be characterized by at least one of the transmitter segments, for example, such that the rotation positions can be detected by detecting the transmitter segments, particularly as in a crankshaft sensor. The sensor element is, for example, designed to provide a particularly electrical signal, which characterizes the detected transmitter segments, and thus the rotation positions. The respective transmitter segment generates a respective pulse of the signal or of the sensor, for example, such that for example the signal has one pulse per transmitter segment. The transmitter segments, and thus the rotation positions, can be detected or determined using the pulses of the signal. The transmitter segments are thus also described as pulse-emitting segments or pulse-emitting transmitter segments of the transmitter element, particularly of the transmitter wheel.

It is preferably provided that a number of the pulse-emitting segments of the transmitter element corresponds at least to the sum of a number of teeth of the switching gearing of the one switching part and a number of tooth gaps of the switching gearing of the one switching part.

The feature that the electronic computing device is designed to move the switching parts from the coupled position into the uncoupled position depending on the detected rotation positions should particularly be understood to mean that the electronic computing device is designed to effect a movement of the switching parts from the uncoupled position into the coupled position. For this purpose, at least one of the switching parts or an actuator is controlled by means of the electronic computing device. It is further preferably provided that the electronic computing device is designed to move the switching parts from the coupled position into the uncoupled position, and thus to effect a movement of the switching parts from the coupled position into the uncoupled position. Moving the switching parts from the uncoupled position into the coupled position is also described as engaging the claw switching element. Moving the switching parts from the coupled position into the uncoupled position is also described as disengaging the claw switching element. The claw switching element can thus be engaged and disengaged by means of the electronic control device.

As already previously indicated, it is preferably provided that the first switching part and/or the second switching part, particularly of only one of the switching parts with regard to the switching parts, is connected to an output of an electric engine or the previously specified electric engine in terms of drive. This can particularly be understood to mean that the first and/or second switching part, particularly the one switching part, is connected to the output, particularly to a shaft, of the electric engine in a manner fixed against rotation.

The claw switching element can then particularly be meshed with a high switching comfort if a number of pulses, i.e., the number of transmitter segments, is at least as high as the number of teeth and the number of tooth gaps of the switching gearing of the one switching part combined. A so-called absolute resolution is then present, such that the rotation positions of the one switching part can be detected particularly precisely. If the switching gearing has 60 teeth, and thus 60 tooth gaps, for example, then the number of transmitter segments is preferably 120, such that the number of pulses is also 120.

In a further embodiment of the invention, it is provided that the number of transmitter segments is at least twice as large as the previously described sum. It is thus preferably provided that the number of transmitter segments is at least four times the number of teeth of the switching gearing of the one switching part.

In a further embodiment of the invention, it is provided that the transmitter element has a defect, also described as a defect gap, at which a first width of a first gap between two neighboring transmitter segments of the transmitter element running around the axis of rotation in the circumferential direction of the transmitter element is larger than second widths of second gaps running in the circumferential direction of the transmitter element or all the other gaps between neighboring transmitter segments of the transmitter element. Using the defect, one of the rotation positions can be used as a reference location or reference position, proceeding from which the other rotation positions can advantageously be detected or determined, particularly in such a way that the claw switching element is for example only meshed into those rotation positions in which a tooth-on-tooth position will not occur.

It is further preferably provided that one locking tooth is respectively arranged between two catching teeth.

It can further preferably be provided that the claw switching element is designed as a claw brake, wherein the sensor is connected to the other switching part that is fixedly connected to the housing of the transmission, and the transmitter element is fixedly connected to a moveable switching part. This is advantageous in that the meshing process can be controlled particularly precisely in the case of a switching part fixed to the housing, as the sensor then has the rotational speed zero, and thus does not rotate relative to the housing around the axis of rotation.

In a further embodiment of the invention, it is conceivable that the claw switching element is also designed as a claw coupling, wherein, for example, the other switching part is connected to vehicle wheels or to at least or exactly one vehicle wheel of the motor vehicle in terms of output or in a manner fixed against rotation. A rotational speed of the other switching part can thus be determined and thus be known, wherein the rotational speed of the other switching part can be determined from a speed of the motor vehicle that is for example driven along a ground at the speed.

In a further embodiment, it is conceivable that the electronic computing device has or carries out a routine for a pulse arrangement after the motor vehicle starts in the case of an open claw switching element for assigning angle positions or rotation positions to the pulses.

In a further embodiment of the invention, it is conceivable that the control device has a learning routine, particularly to be carried out in the band end test after and/or during vehicle production (EOL Test (End of Line test)) or after changing gear in the operation of the motor vehicle, which serves to ascertain for every pulse whether a meshing can occur or not when the claw switching element is engaged.

In a further embodiment, it is particularly provided as an alternative to the learning routine that the transmitter wheel has a marking, notch or the like, such that the angle position of the defect pulse of the transmitter wheel has the same fixed, pre-determined value with regard to the sensor in each series transmission. If the transmission wheel has a marking, for example, and there is a pre-set that the transmitter wheel should always be installed in the same angle position, then the learning routine is not required. It is particularly conceivable that the routine for assigning the pulses should be carried out before the learning routine for each newly constructed transmission, which is also described as learning.

The defect is also described as a defect pulse, wherein it is conceivable that exactly one or several defects or defect pulses are provided. The larger or wider transmitter gap compared to the other transmitter gaps at the defect leads to two neighboring pulses of the signal having a greater spacing from each other than the usual neighboring pulses, such that the transmitter gap or the defect pulse can be recognized. All pulses following the defect pulse can be provided with an index such that a respective angle position or the respective rotation position of the one switching part, e.g., connected to a shaft in a manner fixed against rotation, can be determined. The number of pulses, which are generated by magnetized flywheels or by teeth, for example, is preferably significantly larger than the number of claw teeth by at least a factor of four. It is assigned to the indices of the pulses or to the indices of the regions between the two pulses whether they correspond to a gap or to a tooth-on-tooth position via targeted construction and/or a learning routine. Using this information, and using a rotational speed transmitter that is as precise as possible, the claws can be kept in the gap position to engage or mesh the claws, such that the tooth-on tooth position is avoided.

The invention also includes a method for operating a switching device according to the invention. Advantages and advantageous embodiments of the switching device according to the invention should be seen as advantages and advantageous embodiments of the method according to the invention and vice versa.

Further advantages, features and details of the invention result from the following description of a preferred exemplary embodiment and with reference to the drawing. The features and combinations of features previously specified in the description and the features and combinations of features specified in the following description of the FIGURE and/or shown only in the single FIGURE can be used not only in the respectively disclosed combination, but also in other combinations or in isolation without leaving the scope of the invention.

BRIEF DESCRIPTION OF THE DRAWING

In the single FIGURE, the drawing shows a partial schematic depiction of a switching device according to the invention for a transmission of a motor vehicle.

DETAILED DESCRIPTION OF THE DRAWING

The single FIGURE shows a switching device 10 for a transmission of a motor vehicle, particularly a motor car, in a partial schematic depiction. The transmission has a housing 12 particularly schematically depicted in the FIGURE.

The switching device 10 comprises at least one unsynchronized claw switching element 14, which is also simply described as a switching element or claw. The motor vehicle comprises an electric engine, for example, by means of which the motor vehicle can be driven electrically, particularly purely electrically, particularly in such a way that at least or exactly two vehicle wheels of the motor vehicle can be driven by means of the electric engine. The electric engine has a stator and a rotor that can be rotated relative to the stator, via which the motor vehicle can be driven. The claw switching element 14 has a first switching part 16 and a second switching part 18. As depicted in the FIGURE by the dashed arrow 20, the switching part 18 can be rotated relative to the switching part 16 and relative to the housing 12 around an axis of rotation 22. It is particularly conceivable that the switching part 16 is fixed to the housing 12 in a manner fixed against rotation and thus cannot be rotated relative to the housing 12 around the axis of rotation 22. It is particularly conceivable that the switching part 18 is connected to the rotor of the electric engine in a manner fixed against rotation.

The switching part 16 has a first switching gearing 24 having first teeth 26 and first tooth gaps 28 arranged between the teeth 26. The switching part 18 has a second switching gearing 30 having second teeth 32 and second tooth gaps 34 arranged between the teeth 32. It can be recognized that the respective teeth 26 and 32 have respective lengths running in parallel to the axis of rotation 22. The length of teeth labelled Z1 in the FIGURE is greater than the length of teeth labelled Z2 in the FIGURE, wherein the respective tooth Z1 is also described as a catching tooth and the respective tooth Z2 is also described as a locking tooth. The claw switching element 14 and the switching gearings 24 and 30 are designed as described in DE 10 2012 043 592 A1, for example.

It can be seen from the FIGURE that the switching gearing 24 faces the switching gearing 30 axially, i.e., along the axis of rotation 22, and the switching gearing 30 faces the switching gearing 24 axially. The switching parts 16 and 18 can be displaced between at least one coupled position and at least one uncoupled position shown in the FIGURE relative to each other along the axis of rotation 22. The switching gearings 24 and 30 engage with one another in the coupled position, whereby the switching parts 16 and 18 are connected to each other in a form-fit manner fixed against rotation. The switching gearings 24 and 30 are uncoupled from each other in the uncoupled position. This means that the switching gearings 24 and 30 do not engage with each other in the uncoupled position, such that the switching parts 16 and 18 can be rotated relative to each other around the axis of rotation 22 in the uncoupled position. Moving the switching parts 16 and 18 from the uncoupled position into the coupled position is also described as meshing or a meshing process or engaging the claw switching element 14.

In order to be able to mesh the claw switching element 14 particularly advantageously, the switching device 10 comprises a detection device 36, by means of which the rotation positions into which the switching part 18 can be rotated relative to the switching part 16 and relative to the housing 12 around the axis of rotation 22 can be or are detected. An electronic computing device 38 particularly depicted schematically in the FIGURE is additionally provided, by means of which the switching parts 16 and 18 can be moved from the uncoupled position into the coupled position depending on the detected rotation positions.

The detection device 36 has a transmitter element 40 particularly schematically depicted in the FIGURE and designed as a transmitter wheel, which particularly respectively has at least one pole pair 42 per tooth 32 and per tooth gap 34, for example. The transmitter element 40 and thus the pole pairs 42 are connected to the switching part 18 in a manner fixed against rotation. The detection device 36 additionally comprises a sensor element 44 also simply described as a sensor, which is connected to the housing 12 and/or to the switching part 16 in a manner fixed against rotation. The pole pairs 42 are transmitter segments of the transmitter element 40, and can be detected by means of the sensor element 44. The sensor element 44 provides a signal 46, particularly an electric signal, e.g., designed as a raw signal, which has one Pulse P, particularly exactly one, per detected pole pair 42. The transmitter element 40 has a defect F also described as a defect gap, at which a first width of a first gap between two neighboring pole pairs 42 running around the axis of rotation 22 in the circumferential direction of the transmitter element 40 is larger than second widths of second gaps running in the circumferential direction of the transmitter element between neighboring pole pairs 42. In the signal 46, the defect F is characterized in that a first spacing between two neighboring pulses P of the signal 46 is larger than second spacings between other pulses P of the signal 46. The defect F thus characterizes one of the rotation positions, such that this one rotation position can be used as a reference position or reference location. The reference location is thus known, for example, and thus a known location of the switching part 18 relative to the switching part 16. The rotation positions in which a tooth-on-tooth position will not occur when meshing the claw can be determined or identified on the basis of the reference location. The claw switching element 14 can thus be particularly advantageously meshed.

LIST OF REFERENCE CHARACTERS

10 switching device
12 housing
14 switching element
16 switching part
18 switching part
20 arrow
22 axis of rotation
24 switching gearing
26 tooth
28 tooth gap
30 switching gearing
32 tooth
34 tooth gap
36 detection device
38 electronic computing device
40 transmitter element
42 pole pair
44 sensor element
46 signal
F defect
P pulse
Z1 tooth
Z2 tooth

The invention claimed is:

1. A switching device (10) for a transmission of a motor vehicle, comprising:
   an unsynchronized claw switching element (14) that comprises a first switching part (16) and a second switching part (18) which are rotatable relative to each other around an axis of rotation (22), wherein the first switching part (16) has a first switching gearing (24) and the second switching part (18) has a second switching gearing (30) which are displaceable relative to each other along the axis of rotation (22) between a coupled position, in which the first and second switching gearings (24, 30) engage with each other such that the first and second switching parts (16, 18) are coupled to each other in a manner fixed against rotation, and an uncoupled position, in which the first and second switching gearings (24, 30) are uncoupled from each other such that the first and second switching parts (16, 18) are rotatable relative to each other around the axis of rotation (22);

a detection device (36), wherein rotation positions in which the first and second switching parts (16, 18) are rotated relative to each other around the axis of rotation (22) are detectable by the detection device; and an electronic computing device (38), wherein the electronic computing device (38) moves the first and second switching parts (16, 18) from the uncoupled position into the coupled position depending on detected rotation positions;

wherein the detection device (36) comprises a sensor element (44) and a transmitter element (40) fixedly connected to the second switching part (18) such that the transmitter element (40) is rotated with the second switching part (18) relative to the sensor element (44) around the axis of rotation (22) and wherein the transmitter element (40) has transmitter segments (42) that are detectable by the sensor element (44) such that the rotation positions are detected by detecting the transmitter segments (42);

wherein a number of the transmitter segments (42) corresponds to at least a sum of a number of teeth (32) of the second switching gearing (30) of the second switching part (18) and a number of tooth gaps (34) of the second switching gearing (30) of the second switching part (18);

wherein the transmitter element (40) has one tooth (32) and one tooth gap (34) per transmitter segment (42).

2. The switching device (10) according to claim 1, wherein the transmitter element (40) has a defect (F) at which a first width of a first gap between first neighboring transmitter segments (42) of the transmitter element (40) running around the axis of rotation (22) in a circumferential direction of the transmitter element (40) is larger than a second width of a second gap running in the circumferential direction of the transmitter element (40) between second neighboring transmitter segments (42) of the transmitter element (40).

3. A method for operating the switching device (10) according to claim 1, comprising the steps of:

detecting a rotation position in which the first and second switching parts (16, 18) have been rotated relative to each other around the axis of rotation (22) and in which the first and second switching parts (16, 18) are in the uncoupled position by the detection device (36); and moving the first and second switching parts (16, 18) from the uncoupled position into the coupled position depending on the detected rotation position by the electronic computing device (38).

* * * * *